METHOD AND APPARATUS FOR TESTING SUBSCRIBERS' TELEPHONE INSTRUMENTS IN SITU UNDER SERVICE CONDITIONS

Filed Oct. 29, 1962 2 Sheets-Sheet 1

Inventors
James Francis Millward Bryant
Robert Wymondham Kett
by Hill, Sherman, Meroni, Gross & Simpson
Attys.

July 19, 1966 J. F. M. BRYANT ET AL 3,261,926

METHOD AND APPARATUS FOR TESTING SUBSCRIBERS' TELEPHONE INSTRUMENTS IN SITU UNDER SERVICE CONDITIONS

Filed Oct. 29, 1962 2 Sheets-Sheet 2

INVENTORS
James Francis Millward Bryant
Robert Wymondham Kett

BY Hill, Sherman, Meroni, Gross & Simpson ATTORNEYS

1

3,261,926
METHOD AND APPARATUS FOR TESTING SUBSCRIBERS' TELEPHONE INSTRUMENTS IN SITU UNDER SERVICE CONDITIONS

James Francis Millward Bryant, Highett, Victoria, and Robert Wymondham Kett, Chadstone, Victoria, Australia, assignors to Commonwealth of Australia Filed Oct. 29, 1962, Ser. No. 233,699
7 Claims. (Cl. 179—175.1)

The present invention relates to methods for testing the performance of subscribers' telephone sets in situ, and in association with the subscriber's line. In the ensuing description the term "telephone set" is defined as including the telephone instrument, bell and induction coil.

At present several methods are employed to test the performance of subscribers' telephone sets. The most commonly used one is speech to and from a test desk at a telephone exchange, sometimes through an attenuator. The deficiencies of this method are readily apparent, as the normal variations in speech power, hearing acuity and background noises preclude the attainment of any worthwhile degree of precision. This method is therefore satisfactory only in cases of catastrophic failure of the telephone set.

According to another known method, noise generators are applied to the transmitter of the telephone set and the output is received and measured at the test desk in a telephone exchange on a so-called "volume unit" meter, which is a normal A.C. voltmeter calibrated in decibels. This method has disadvantages in that, firstly, it requires the constant assistance of an operator at the test desk in the exchange to read the volume unit meter and, secondly, it does not provide for the testing of the receiver of the telephone set, which has been hitherto assumed to be the component which is least likely to deteriorate in practice. This assumption, however, does not apply in a significant proportion of practical cases, and therefore provision for the testing of the receiver of the telephone set is desirable.

Another more recently devised method of performance testing a telephone set entails the use of a so-called portable efficiency tester, which incorporates a noise generator, a voltmeter, transmitting and receiving devices and switching means. The efficiency tester may be connected to a telephone set to test its sending and receiving efficiencies and its side-tone transmission in situ on the subscribers' premises, telephone booths or call offices. One of the main disadvantages of this method is that the portable efficiency tester is a comparatively large and heavy instrument which is quite unwieldly for transport and handling by a fault technician, who is usually required to travel to the locations where complaints occur by a bicycle, by public transport, or even on foot. However, the principal disadvantage inherent in this method is that the efficiency of the telephone set alone is measured without reference to its local exchange line.

It is the main object of the present invention to provide a method and apparatus for the testing of subscribers' telephone sets in situ under service conditions in which the overall performance of the telephone set, the local line and other components of the telephone system in tandem are objectively measured and the disadvantages referred to above are overcome. Other aims and object of the invention will become apparent from the ensuing description.

According to the invention there is provided a method for testing subscribers' telephone sets in situ, in which direct current to operate the telephone set and a reference voice-frequency alternating current are transmitted from an exchange, and a testing apparatus is connected between the exchange line and the telephone set to be tested, said testing apparatus comprising an electro-acoustic transducer, voltage measuring means and switching means, whereby said currents may be directed along alternative paths through the testing apparatus and the telephone set to measure the performance characteristics of the telephone set and its local exchange line.

2

The invention also includes a testing apparatus for use in the method referred to, which comprises an electro-acoustic transducer, voltage measuring means, switching means and means for selectively directing an alternating current transmitted from an exchange through alternative paths through a telephone and the testing apparatus, whereby the performance of the telephone set and its local exchange line may be measured.

In order that the invention may be more fully understood, a presently preferred embodiment thereof and its mode of operation will now be described in detail with reference to the accompanying schematic circuit diagrams, in which FIGURE 1 is a block diagram showing how the testing apparatus is connected to the telephone circuit;

Figures 1, 2:
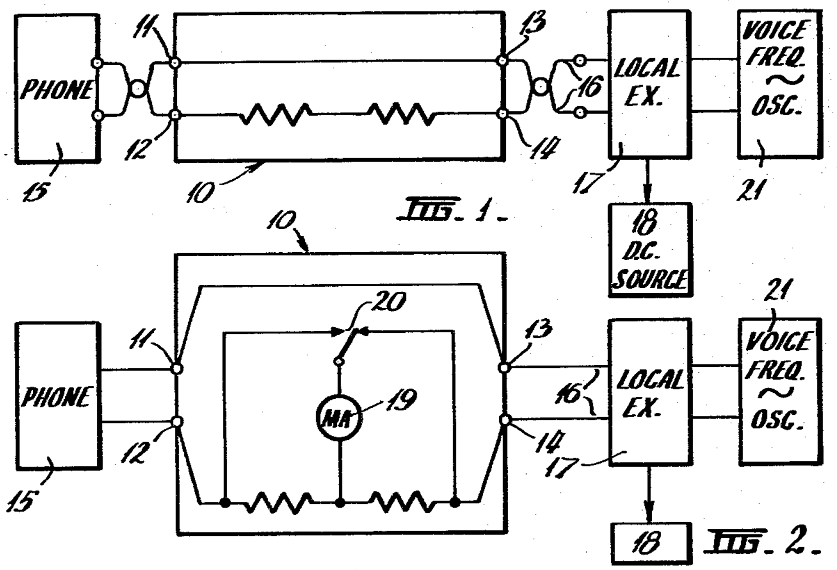
FIGURE 2 is a block circuit diagram showing the testing apparatus arranged to measure the telephone line current.

The practical telephone testing apparatus referred to comprises a portable box-like container 10 in which the working parts of the testing apparatus are accommodated. The apparatus has four external terminals, 11, 12, 13, 14, two of which (11, 12) are for connection to the telephone instrument 15, and the other two (13, 14) for connection to the telephone line 16 leading to the local exchange 17. In use the testing apparatus 10 is connected, or interposed, in the telephone line 16 between the subscriber's telephone set 15 and the local exchange 17 as shown in FIGURE 1, but the instrument is so arranged that this interposition does not serve to interrupt telephonic communication with the exchange, whereby direct current supplied from a constant potential source 18 through the exchange 17 is available to energize the transmitter of the telephone set 15 when its receiver is lifted before dialling a number for the purpose of making a call.

Figure 5:
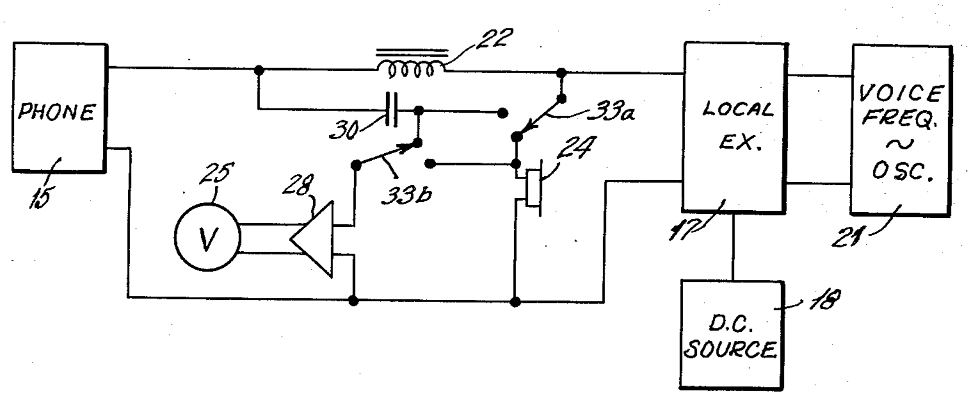
FIGURE 5 is a schematic circuit diagram of the testing apparatus, showing the switching means whereby the apparatus is arranged to measure the sending performance of the telephone set.
Figure 6:
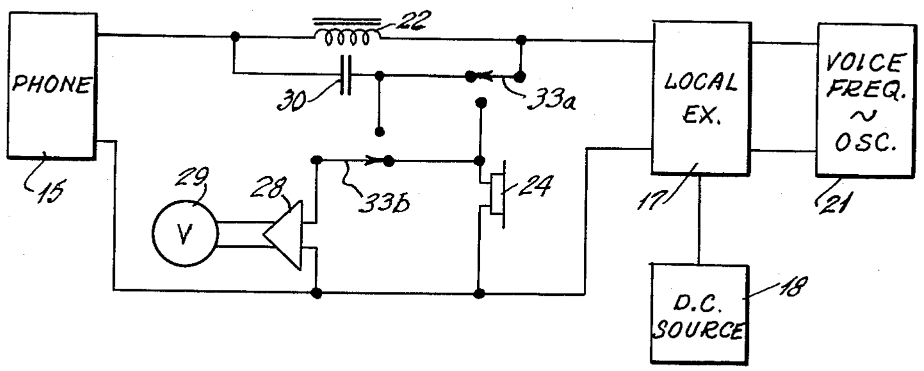
FIGURE 6 is a schematic circuit diagram of the testing apparatus, showing the switching means whereby the apparatus is arranged to measure the receiving performance of the telephone set.

When the testing apparatus 10 is connected to the telephone set 15 in the manner described, the line current of the telephone line 16 may be measured. The circuit arrangement for doing this is shown in FIGURE 2. By actuating a selector switch (indicated schematically by the switch elements 33*a* and 33*b* in FIGURES 5 and 6), a milliammeter 19 is placed in series circuit relationship with the local exchange line 16, enabling the line current to be measured on the meter. The testing apparatus 10 is also provided with a polarity changing device 20 for the milliammeter 19, since the two identical telephone lines leading to subscriber's telephone sets cannot be identified as the positive or negative line respectively, whereby the milliammeter, if at first wrongly connected, may have its polarity changed and a reading is obtainable without first interchanging the connections to the meter.

A voice frequency oscillator 21 is provided at the local exchange, and its output is made available by standard switching and interconnecting arrangements to any telephone set dialling a predetermined calling number. The output of the oscillator 21 is carefully controlled and consists of frequencies within the range of 300 to 3,000 cycles per second, which is the nominal telephone voice transmission band. In order to preserve the effective working life of the oscillator, it is maintained in operation only when connected to a telephone set on which the predetermined calling number has been dialled.

Figures 3, 4:
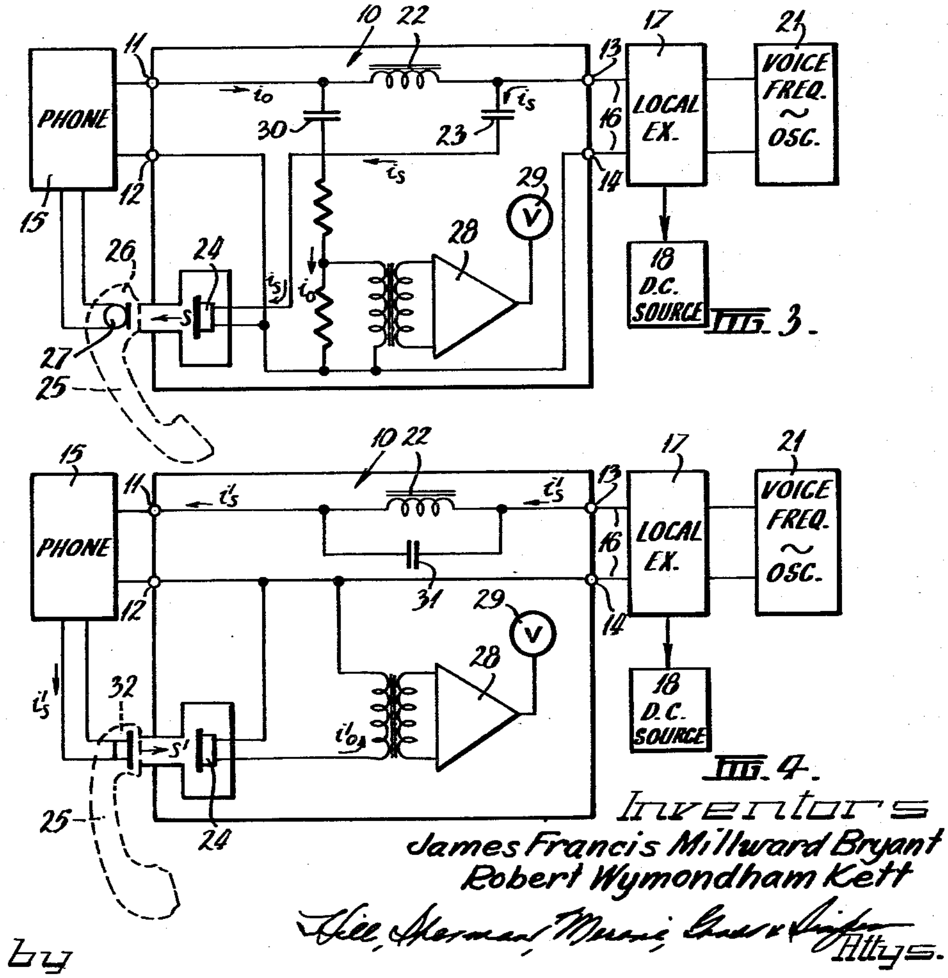
FIGURE 3 is a schematic circuit diagram showing the testing apparatus arranged to measure the sending performance of the telephone set.
FIGURE 4 is a schematic circuit diagram showing the testing apparatus arranged to measure the receiving performance of the telephone set.

The circuit arrangement for measuring the sending performance of the telephone set 15 is shown in FIGURE 3. Actuation of a selector switch (i.e., the switch elements of 33*a* and 33*b* of FIGURES 5 and 6) of the testing apparatus 10 serves to interpose an iron-cored choke 22 in the telephone line 16 from the exchange to the telephone set, whereby the voice-frequency signal $i_s$ from the exchange oscillator 21 is prevented from passing into the telephone set; without, however, interrupting the normal flow of direct current, which is required for the operation of the telephone set. The voice-frequency signal $i_s$ from the exchange oscillator 21 travels along the path indicated by the arrows, through a capacitance 23, to a reciprocal electro-acoustic transducer 24 in the testing apparatus. In this application the transducer 24 operates as an artificial "voice" source. The direct current from the exchange which also flows along the telephone lines, is prevented from passing to the transducer 24 by the capacitance 23. The handset 25 of the telephone set 15 is placed on the testing apparatus 10 so that the mouthpiece 26 is disposed close to the transducer 24, whereby sound energy S emanating from the transducer impinges upon the mouthpiece element 27 of the telephone set 15, and is consequently transmitted by the set. The testing apparatus is so arranged that the sound energy $i_o$ transmitted by the telephone set travels along the path indicated by the arrows to an amplifier 28 in the testing apparatus and is then measured on an alternating current voltmeter 29. The iron-cored choke 22 serves to block the output current $i_o$ of the telephone set from being sent out of the testing apparatus. A capacitance 30 is located in series circuit relationship with the telephone set 15 and the amplifier 28 so as to prevent direct current from entering the latter. The reading obtained on the alternating current voltmeter 29 is indicated on a calibrated scale the zero point of which is related to the known out-put level of the voice-frequency oscillator 21 at the exchange to give a measure of the sending performance of the telephone set tested, including the effect of the local line 16 and other components of the telephone system in tandem.

FIGURE 4 illustrates the circuit arrangement of the testing apparatus for measuring the receiving performance of the telephone set. Appropriate operation of the selector switch elements 33*a* and 33*b* serves to connect the voice frequency signal $i'_s$ from the exchange oscillator 21 directly to the telephone set 15. This is accomplished by switching a by-passing capacitance 31 across the iron-cored choke 22. The ear-piece 32 of the handset 25 is placed adjacent to the transducer 24 of the apparatus and, in response to signals $i'_s$ received from the exchange, generates sound energy S' which, on impinging upon the reciprocal transducer 24, generates an electrical signal $i'_o$ in the transducer circuit. The output signal $i'_o$ is amplified by the amplifier 28 and is measured by the alternating current voltmeter 29 in a manner similar to that already described above with reference to the measuring of the sending performance of the telephone set. The reading on the voltmeter 29, when considered relative to a zero point which is related to the known output level of the voice-frequency oscillator 21 at the exchange, provides an objective, quantitative indication of the receiving performance of the telephone set including the effect of the local line and other components of the telephone system in tandem.

Additional facilities may be also provided in the testing apparatus for the measurement of other characteristics of a telephone set, such as side-tone effects, insulation resistances and the like, as well as reflection and insertion losses of the local line with respect to any termination, but these are not regarded as essential requirements for a testing apparatus of the type herein described. It is considered essential that the testing apparatus should be operable entirely independently of the exchange testing facilities, and should not require the services of an exchange operator.

A method of testing telephone sets and a testing apparatus in accordance with the present invention provide a number of important advantages as compared to presently used methods and instruments. In particular, the method and the testing apparatus give assurance to the fault technician that a fault has been correctly diagnosed, or that it has been removed by repairs carried out to the set line or associated apparatus. The reading dial on the testing instrument may be conveniently calibrated into ranges which are marked as acceptable and unacceptable, so that the subscriber is assured that his service was in, or has been restored to, a satisfactory operating condition thereby providing an effective answer to subscribers complaints in the cases where the service itself is not at fault.

Furthermore, by using the method and testing apparatus according to this invention it should be possible to prevent wastages of easily replaceable components of telephone sets, such as transmitter or receiver inserts, which in the past have been frequently replaced unnecessarily because the real nature of a fault had not been located. Another advantage is that partly aged transmitters, which would be rejected as unsuitable on a telephone efficiency tester, or any other apparatus adapted to test the efficiency of the telephone set alone, may remain in service when installed on short loops and a satisfactory service performance, as measured by the telephone testing apparatus herein described, may be often obtained. A further advantage is that the testing apparatus may be used for the measurement of the effectiveness of calling devices, in particular by measuring the loudness of calling signals received at a telephone from electro-acoustic devices.

From the foregoing it will be apparent that a method of an apparatus for testing subscribers' telephone sets in situ as herein described provide substantial improvements over the prior art in this field. Various circuit modifications and variations may, however, be made and the invention is accordingly not to be construed as being limited in scope to the preferred embodiment described herein.

We claim:

1. A method for testing subscribers' telephone sets in situ, comprising the steps of supplying a direct current from a telephone exchange through a telephone line to operate a telephone set, applying a reference voice frequency signal from said exchange to said telephone set, deriving from said telephone set electrical output voltages generated therein in response to said reference signals, said electrical output voltages being derived via an electro-acoustic transducer, and measuring said electrical output voltage, whereby an indication of the performance characteristics of the telephone set is obtained.

2. A method for testing in situ the sending performance of subscribers' telephone sets, comprising the steps of supplying a direct current from a telephone exchange through a telephone line to operate a telephone set which has a mouthpiece and an earpiece, interposing an electro-acoustic transducer in the telephone line between said exchange and said telephone set, applying a reference voice frequency signal from said exchange to the mouthpiece of said telephone set via said electro-acoustic transducer, whereby said signal is applied in the form of sound energy, deriving an output voltage from the telephone set in response to the set reference signal, blocking the transmission of said output voltage from the telephone set to the exchange, and measuring said output voltage, whereby an indication of the sending performance of the telephone set is obtained.

3. A method for testing in situ the receiving performance of a subscriber's telephone set, comprising the steps of supplying a direct current from a telephone exchange through a telephone line to operate the telephone set which has a mouthpiece and an earpiece, applying a reference voice frequency signal from said exchange to said telephone set in the form of an electrical input voltage, deriving a sound energy output from said earpiece of the telephone set in response to said reference signal, applying said sound energy output to an electro-acoustic transducer to generate an electric output voltage, and measuring said electric output voltage, whereby an indication of the receiving performance of the telephone set is obtained.

4. Apparatus for testing subscribers' telephone sets in situ, comprising means for connecting the apparatus in a telephone line between an exchange and a telephone set, voice frequency alternating current means at the exchange for applying a reference signal to the apparatus, electro-acoustic transducer means in the apparatus for applying said reference signal to the telephone set during a first instance and for receiving said reference signal from the telephone set during a second instance, alternating voltage measuring means in circuit with said electro-acoustic transducer means for indicating the relative performance of the telephone set during said first and second instance, means for selectively directing said reference signal from the exchange through alternative paths in the testing apparatus during said first and second instance, and switch means in the apparatus for selectively changing said path of said reference signal thereby determining the receiving ability of the telephone set during said first instance and determining the sending ability of the telephone set during said second instance.

5. Apparatus for testing subscribers' telephone sets in situ as claimed in claim 4, wherein said means for selectively directing a refrence signal includes alternating current blocking means, said blocking means being adapted to be interposed by switching in the telephone line between said telephone set and said exchange to prevent transmission of alternating currents therebetween.

6. Apparatus for testing subscribers' telephone sets in situ as claimed in claim 5, wherein the alternating current blocking means is an iron-cored choke.

7. Apparatus for testing subscribers' telephone sets in situ as claimed in claim 4, wherein the electro-acoustic transducer is a reciprocal transducer, being capable of operating both as a microphone and as a loudspeaker, depending on the manner in which input energy is applied thereto.

References Cited by the Examiner

UNITED STATES PATENTS

| | | | |
|---|---|---|---|
| 1,609,398 | 12/1926 | Brigham | 179—175 |
| 2,847,506 | 8/1958 | Gray et al. | 179—1 |
| 3,093,711 | 6/1963 | Comerci et al. | 179—175 |

KATHLEEN H. CLAFFY, *Primary Examiner.*

ROBERT H. ROSE, *Examiner.*

F. N. CARTEN, *Assistant Examiner.*